US012597645B2

(12) United States Patent
    Darbandi

(10) Patent No.:     US 12,597,645 B2
(45) Date of Patent:         Apr. 7, 2026

(54) CYLINDRICAL ENERGY STORAGE CELL

(71) Applicant: Bayerische Motoren Werke Aktiengesellschaft, Munich (DE)

(72) Inventor: Azad Darbandi, Fraunberg (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 308 days.

(21) Appl. No.: 18/280,713

(22) PCT Filed: Mar. 4, 2022

(86) PCT No.: PCT/EP2022/055602
    § 371 (c)(1),
    (2) Date: Sep. 7, 2023

(87) PCT Pub. No.: WO2022/194580
    PCT Pub. Date: Sep. 22, 2022

(65)         Prior Publication Data
    US 2024/0162498 A1      May 16, 2024

(30)      Foreign Application Priority Data

Mar. 16, 2021    (DE) ..................... 10 2021 106 338.8

(51) Int. Cl.
    *B60K 1/04*              (2019.01)
    *B60L 50/60*             (2019.01)
                (Continued)
(52) U.S. Cl.
    CPC ......... *H01M 10/0587* (2013.01); *B60L 50/60* (2019.02); *H01M 10/613* (2015.04);
                (Continued)
(58) Field of Classification Search
    CPC ........... H01M 10/0525; H01M 4/8896; H01M 2/2077; H01M 10/643; H01M 50/536;
                (Continued)

(56)          References Cited

U.S. PATENT DOCUMENTS 8,403,090 B2 *   3/2013  Fujiwara ............. H01M 50/224
                                                      429/96
    2012/0156561 A1    6/2012  Onose et al.
                    (Continued)

FOREIGN PATENT DOCUMENTS

EP        3 872 918 A1      9/2021
    JP        2006-147392 A     6/2006
                    (Continued)

OTHER PUBLICATIONS

International Search Report (PCT/ISA/210) issued in PCT Application No. PCT/EP2022/055602 dated Jul. 29, 2022 with English translation (4 pages).

(Continued)

*Primary Examiner* — Jason D Shanske
*Assistant Examiner* — James J Triggs
(74) *Attorney, Agent, or Firm* — Crowell & Moring LLP

(57)          ABSTRACT

A cylindrical energy storage cell includes a cylindrical housing, which has a cover, a bottom and a peripheral jacket between the cover and the bottom; and an electrode winding, which has a strip-type cathode, a strip-type anode and a strip-type separator between the cathode and the anode and which is disposed in the housing. The cathode has a first current collector, which is coated, in parts, with a first active material. The anode has a second current collector, which is coated, in parts, with a second active material. At least one wrap of a part of the second current collector not coated with the second active material is disposed around the electrode winding and in electrically conductive contact with the bottom and/or with the jacket.

11 Claims, 6 Drawing Sheets

(51) Int. Cl.

| | |
|---|---|
| *H01M 10/0587* | (2010.01) |
| *H01M 10/613* | (2014.01) |
| *H01M 10/625* | (2014.01) |
| *H01M 10/643* | (2014.01) |
| *H01M 10/6554* | (2014.01) |
| *H01M 50/107* | (2021.01) |
| *H01M 50/533* | (2021.01) |
| *H01M 50/536* | (2021.01) |
| *B60K 6/28* | (2007.10) |

(52) U.S. Cl.
CPC ....... *H01M 10/625* (2015.04); *H01M 10/643* (2015.04); *H01M 10/6554* (2015.04); *H01M 50/107* (2021.01); *H01M 50/533* (2021.01); *H01M 50/536* (2021.01); *B60K 6/28* (2013.01); *B60Y 2200/91* (2013.01); *B60Y 2200/92* (2013.01); *B60Y 2400/112* (2013.01); *H01M 2220/20* (2013.01)

(58) Field of Classification Search
CPC ....... H01M 10/6554; B60K 6/28; B60K 1/04; B60L 50/60
See application file for complete search history.

(56) References Cited

U.S. PATENT DOCUMENTS

| | | |
|---|---|---|
| 2013/0266834 A1 | 10/2013 | Sawa et al. |
| 2019/0081372 A1 | 3/2019 | Capati et al. |
| 2020/0373626 A1 | 11/2020 | Imanishi et al. |

FOREIGN PATENT DOCUMENTS

| | | | |
|---|---|---|---|
| JP | 2007305598 A | * | 11/2007 |
| JP | 2008-91076 A | | 4/2008 |

OTHER PUBLICATIONS

German-language Written Opinion (PCT/ISA/237) issued in PCT Application No. PCT/EP2022/055602 dated Jul. 29, 2022 with English translation (8 pages).

German-language Search Report issued in German Application No. 10 2021 106 338.8 dated Dec. 2, 2021 with partial English translation (12 pages).

* cited by examiner

CYLINDRICAL ENERGY STORAGE CELL

BACKGROUND AND SUMMARY OF THE INVENTION

The present invention relates to a cylindrical energy storage cell which is in particular provided to be used as supplier of energy for a drive of an electric or hybrid vehicle, to an energy storage module comprising at least one cylindrical energy storage cell, and to a vehicle which comprises the energy storage module and a drive motor.

Cylindrical energy storage cells, in particular electrochemical energy storage cells such as lithium-ion batteries, usually comprise a steel housing, in which there are arranged an electrode winding comprising a strip-like cathode, a strip-like anode and a separator arranged therebetween and an electrolyte, in order to ensure the safety of the energy storage cell.

During the system integration of this type of cells, the contact connections of the two poles of the energy storage cells are often arranged on one side, in particular the upper side, of the housing, the current flowing from the anode of the electrode winding via the housing, in particular via an electrically conductive contact, for example welded contact, of the anode with the base of the housing and the shell of the housing to the corresponding pole.

It is an object of the present invention to provide an improved cylindrical energy storage cell.

This object is achieved by the features of the claimed invention.

A cylindrical energy storage cell according to one embodiment, in particular for use as supplier of energy for a drive of an electric or hybrid vehicle, comprises a cylindrical housing with a cover, a base and a circumferential shell lying therebetween, and an electrode winding which comprises a strip-like cathode, a strip-like anode and a strip-like separator arranged therebetween and which is arranged in the housing. The cathode comprises a first current collector which is coated in certain portions with a first active material, the anode comprises a second current collector which is coated in certain portions with a second active material, and at least one winding of a portion of the second current collector, said portion not being coated with the second active material, is arranged around the electrode winding and in electrically conductive contact with the base and/or the shell.

Here, the cylindrical energy storage cell may be in the form in particular of a lithium-ion energy storage cell, wherein the first current collector may comprise aluminum and/or be in the form of aluminum foil, and the second active material may be selected correspondingly. Furthermore, the second current collector may in particular comprise copper and/or be in the form of a copper foil with a thickness lying for example in a range from 4 $\mu$m to 6 $\mu$m, and the second active material may comprise graphite. According to one embodiment, a plurality of windings, for example 5 to 30 windings, of the at least one winding of that portion of the second current collector which is not coated with the second active material around the electrode winding are provided and are arranged in electrically conductive contact with the base and/or the shell.

Preferably, a height of the cylindrical energy storage cell lies in the range from approximately 60 mm to 400 mm, particularly preferably in the range from 60 mm to 150 mm.

In the energy storage cell, the current is conducted from the anode to the corresponding negative pole (arranged for example on the upper side) of the energy storage cell at least partially via the at least one winding of that portion of the second current collector which is not coated with the second active material around the electrode winding, said portion being arranged in electrically conductive contact with the base and/or the shell. Owing to the electrical conductivity of the copper used for the second current collector, said electrical conductivity being considerably higher than that of the steel which is usually used for the housing, the base and/or the shell of the housing can have a lower thickness than in conventional cylindrical energy storage cells while exhibiting the same current flow between the anode and the corresponding negative pole, as a result of which, given the same outer dimensions of the cylindrical energy storage cell, which are usually standardized, more active material can be accommodated in the housing and thus the capacity, in particular the gravimetric and the volumetric energy density, of the cylindrical energy storage cell can be increased. Here, it is in particular possible for a thickness of the shell and/or of the base of the cylindrical energy storage cell, said thickness lying in the range from approximately 0.5 mm to 1.5 mm in conventional cylindrical energy storage cells, to be reduced to approximately 0.2 mm.

Furthermore, owing to the thermal conductivity of copper, which is considerably higher than that of the steel which is usually used for the housing, the transfer of heat within the energy storage cell can be improved considerably. This makes it possible for the energy storage cell to be cooled more efficiently by a base plate, which is for example as flowed through by a cooling fluid, of a (base) cooling device of an energy storage module which comprises a plurality of the energy storage cells. In particular, this makes it possible for the energy storage cells to be cooled efficiently through the use of side cooling from only one side instead of from two sides of the energy storage cells, or even through the use of only a base cooling device, that is to say entirely without the use of side cooling. As a result, the energy density of the energy storage module can be increased, while at the same time the production costs can be reduced.

According to one embodiment, the electrode winding comprises a first end side, a second end side and a circumferential outer side, wherein the first end side faces the cover and the second end side faces the base, a first portion of the at least one winding of that portion of the second current collector which is not coated with the second active material around the electrode winding extends beyond the first end side in the direction of the cover and is electrically conductively connected to the shell, and/or a second portion of the at least one winding or that portion of the second current collector which is not coated with the second active material around the electrode winding extends beyond the second end side in the direction of the base and is electrically conductively connected to the shell.

According to one embodiment, the first portion of the at least one winding of that portion of the second current collector which is not coated with the second active material around the electrode winding, said first portion extending beyond the first end side in the direction of the cover, is electrically conductively connected to the shell by a welded connection, in particular a radial weld seam, and/or the second portion of the at least one winding of that portion of the second current collector which is not coated with the second active material around the electrode winding, said second portion extending beyond the second end side in the direction of the base, is electrically conductively connected to the shell by a welded connection, in particular a radial weld seam.

According to one embodiment, at least one portion of the second end side is formed by portions of the second current collector which are not coated with the second active material, wherein the at least one portion of the second end side of the electrode winding is electrically conductively connected to the base of the housing.

Here, the at least one portion of the second end side may be formed by deformation, for example flat rolling, of portions of the second current collector which protrude after the winding of the electrode winding and which are not coated with the second active material.

According to one embodiment, at least one portion of the first end side is formed by portions of the first current collector which are not coated with the first active material, wherein the at least one portion of the first end side of the electrode winding is electrically conductively connected to the cover of the housing.

Here, the at least one portion of the first end side may be formed by deformation, for example flat rolling, of portions of the first current collector which protrude after the winding of the electrode winding and which are not coated with the first active material.

An energy storage module according to one embodiment comprises an energy storage module housing, and at least one of the above-described cylindrical energy storage cells, which is arranged in the energy storage module housing.

According to one embodiment, the energy storage module further comprises a cooling device comprising a cooling plate which is arranged in the energy storage module housing and on which the at least one cylindrical energy storage cell is arranged.

A vehicle, in particular a hybrid or electric vehicle, according to one embodiment comprises an above-described energy storage module, and a drive motor which can be driven using electrical energy supplied by the at least one cylindrical energy storage cell of the energy storage module.

Further advantageous refinements will emerge from the following description of preferred embodiments.

4

Figures 10, 11:
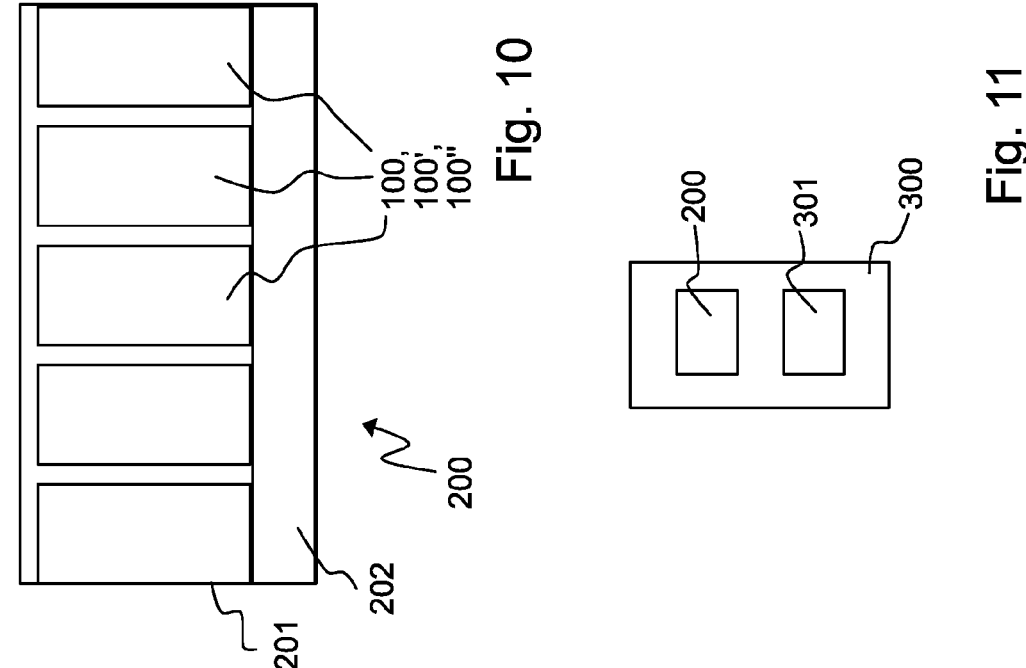
FIG. 10 shows an energy storage module according to one embodiment.

FIG. 11 shows a vehicle according to one embodiment.

DETAILED DESCRIPTION OF THE DRAWINGS

Figure 1:
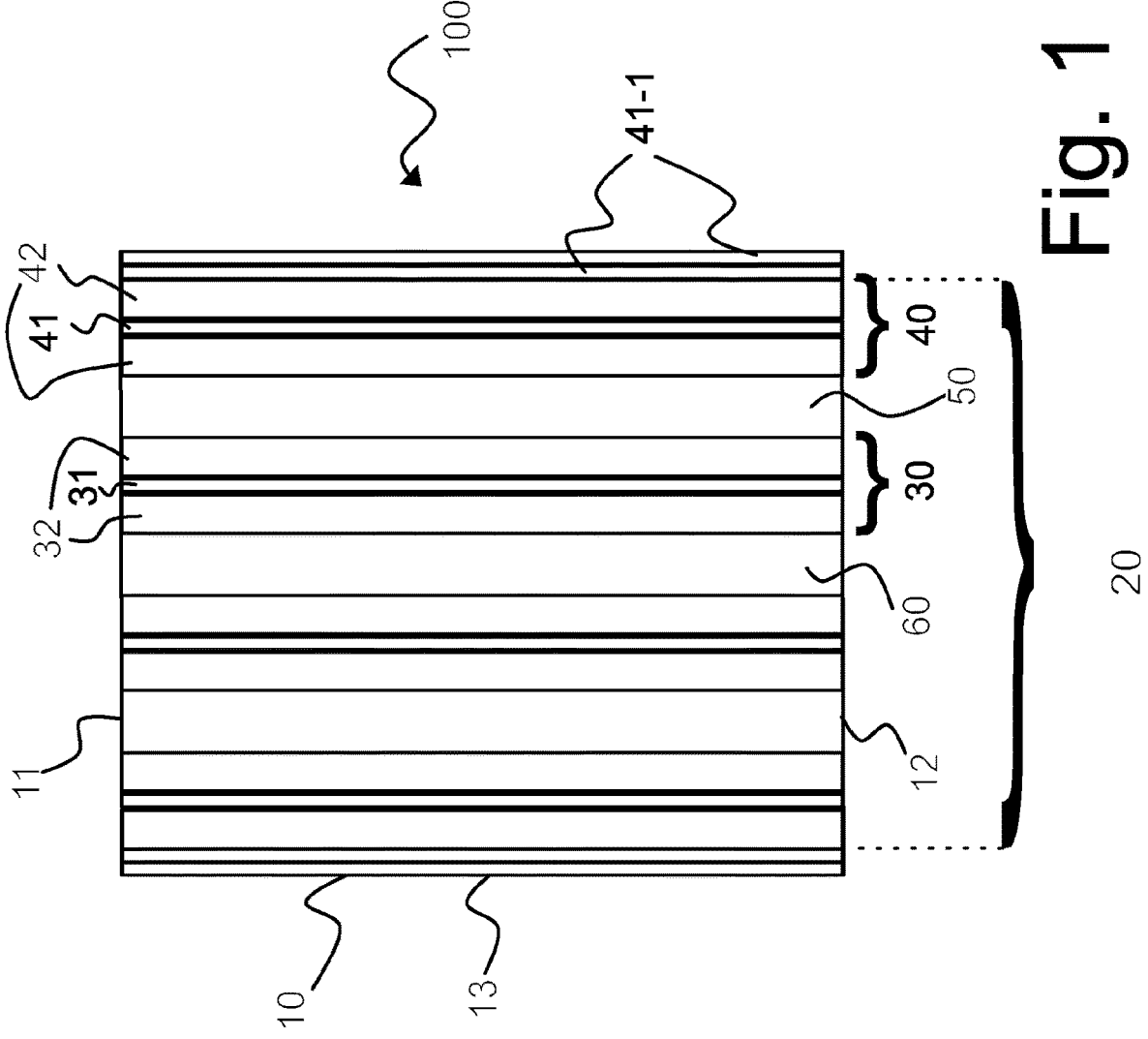
FIG. 1 shows a cylindrical energy storage cell according to one embodiment.

FIG. 1 shows a cylindrical energy storage cell according to one embodiment.

The cylindrical energy storage cell 100, which is in particular configured to supply energy to a drive motor of an electric or hybrid vehicle, is in the form for example of a lithium-ion energy storage cell and comprises a housing 10 with a cover 11, a base 12 and a circumferential shell 13 lying therebetween. Provided in the housing 10 is an electrode winding 20, which comprises a winding core 60, a strip-like cathode 30, a strip-like anode 40 and a separator 50 arranged therebetween, and also an electrolyte which is not shown in FIG. 1.

The strip-like cathode 30 comprises a first current collector 31 which may contain aluminum and/or be in the form of aluminum foil and which is coated in certain portions with a first active material 32. The strip-like anode 40 comprises a second current collector 41 which may contain copper and/or be in the form of copper foil and which is coated in certain portions with a second active material 42. In this case, at least one winding, and in the case illustrated in FIG. 1 two windings, of a portion 41-1 of the second current collector 41, said portion not being coated with the second active material 42, is arranged around the electrode winding 20 and in electrically conductive contact with the base 12 and/or the shell 13.

Figures 2, 3:
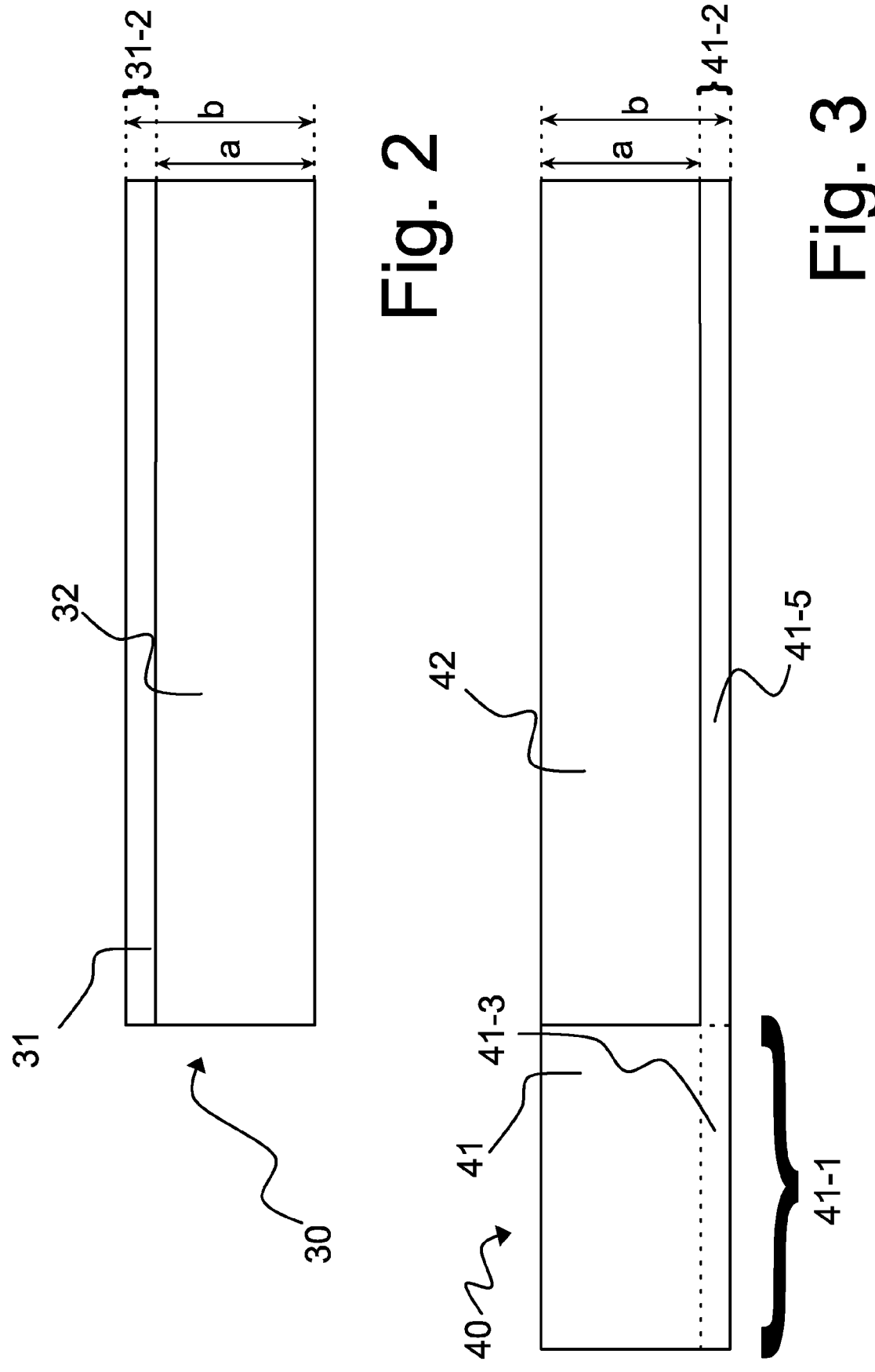
FIG. 2 shows a cathode of an electrode winding of a cylindrical energy storage cell in a non-wound state according to one embodiment.
FIG. 3 shows an anode of the electrode winding of the cylindrical energy storage cell in a non-wound state according to the embodiment.
Figures 7, 8, 9:
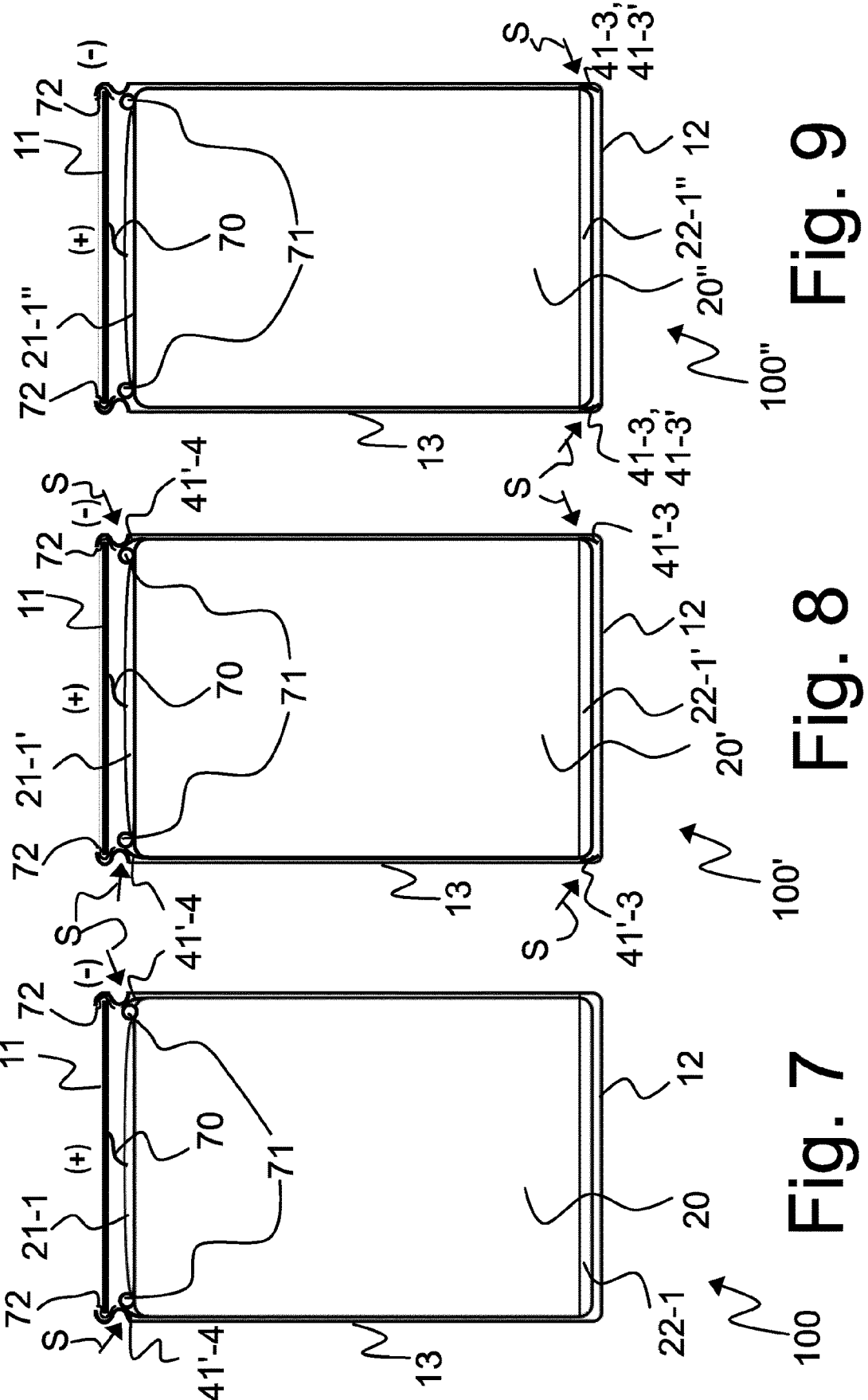
FIG. 7 shows a cylindrical energy storage cell according to one embodiment.
FIG. 8 shows a cylindrical energy storage cell according to a different embodiment.
FIG. 9 shows a cylindrical energy storage cell according to a further, different embodiment.

FIG. 2 shows a cathode of an electrode winding of a cylindrical energy storage cell 100", illustrated in FIG. 9, in a non-wound state according to one embodiment.

The cathode 30 comprises the first current collector 31 which is coated in certain portions with the first active material 32 and which has a width b. Here, the first current collector 31 is coated with the first active material 32 in particular in the region of a width a which corresponds substantially to the height of the interior space of the housing 10, with the result that a portion 31-2 of the first current collector 31, said portion protruding in a vertical direction, is not coated with the first active material 32.

FIG. 3 shows an anode of the electrode winding of the cylindrical energy storage cell 100" in a non-wound state according to the embodiment.

The anode 40 comprises the second current collector 41 which is coated in certain portions with the second active material 42 and which also has the width b. Here, the second current collector 41 is coated in certain portions with the second active material 42, in particular in the region of a width a corresponding to the width a illustrated in FIG. 2, with the result that a portion 41-2 of the second current collector 41, said portion protruding in a vertical or depth direction, is not coated with the second active material 42. In addition, a portion 41-1 of the second current collector 41, said portion adjoining the portion coated with the second active material 42 in a longitudinal direction, is also not coated with the second active material 42 and forms, in the finished state of the cylindrical energy storage cell 100", the at least one winding of that portion 41-1 of the second current collector which is not coated with the second active material 42, said at least one winding being arranged around the electrode winding 20 and in electrically conductive contact with the base and/or the shell 13 of the housing 10.

During the production of the cylindrical energy storage cell 100", the cathode 30 shown in FIG. 2, the anode 40 shown in FIG. 3 and a separator 50 arranged therebetween are wound on the winding core 60, such that only that portion 41-1 of the second current collector 41 which is not coated with the second active material 42 forms the outermost windings.

Figures 4, 5:
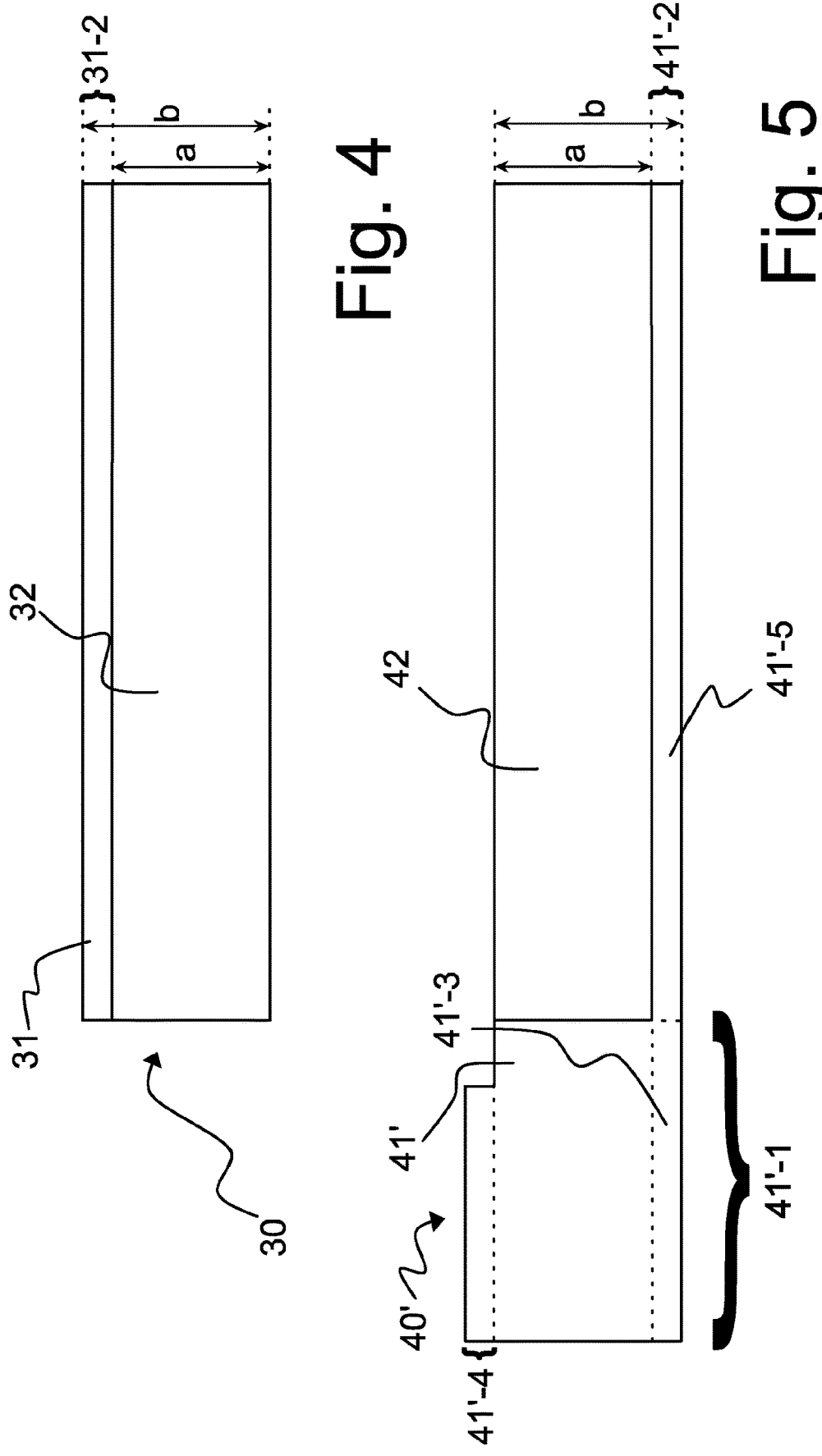
FIG. 4 shows a cathode of an electrode winding of a cylindrical energy storage cell in a non-wound state according to a different embodiment.
FIG. 5 shows an anode of an electrode winding of the cylindrical energy storage cell in a non-wound state according to the different embodiment.

FIG. 4 shows a cathode of an electrode winding of a cylindrical energy storage cell 100', illustrated in FIG. 8, in a non-wound state according to a different embodiment.

The cathode 30 shown in FIG. 4 corresponds to the cathode 30 shown in FIG. 2. Reference is therefore made to the corresponding description of FIG. 2 in relation to the description of FIG. 4.

FIG. 5 shows an anode of an electrode winding of the cylindrical energy storage cell 100' in a non-wound state according to the different embodiment.

The anode 40' comprises the second current collector 41' which is coated in certain portions with the second active material 42 and which also has the width b. Here, the second current collector 41' is coated in certain portions with the second active material 42, in particular in the region of a width a corresponding to the width a illustrated in FIG. 4, with the result that a portion 41'-2 of the second current collector 41', said portion protruding in the vertical direction, is not coated with the second active material 42. In addition, a portion 41'-1 of the second current collector 41', said portion adjoining the portion coated with the second active material 42 in the longitudinal direction, is also not coated with the second active material 42. This portion 41'-1 forms, in the finished state of the cylindrical energy storage cell 100', the at least one winding of the second current collector, said at least one winding being arranged around the electrode winding 20 and in electrically conductive contact with the base and/or the shell 13 of the housing 10.

In contrast to the anode 40 shown in FIG. 3, the second current collector 41' additionally comprises, in the portion 41'-1, a portion 41'-4 which protrudes in the vertical direction, with the result that at least part of the portion 41'-1 has a width which is greater than the width b.

During the production of the cylindrical energy storage cell 100', the cathode 30 shown in FIG. 4, the anode 40' shown in FIG. 5 and a separator 50 arranged therebetween are wound on the winding core 60, such that only the portion 41'-1 of the second current collector 41 forms the outermost windings.

Figure 6:
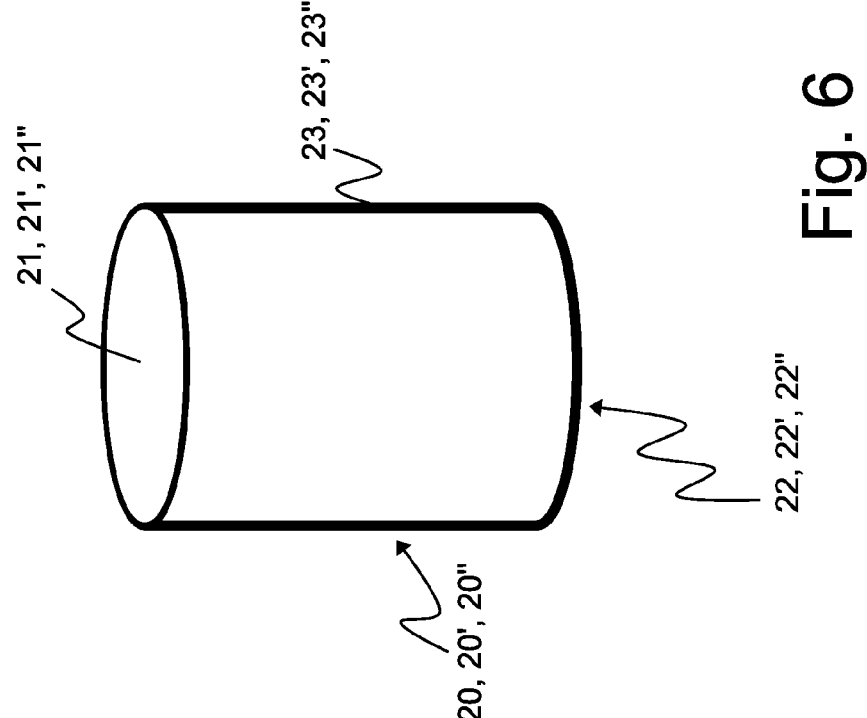
FIG. 6 shows an electrode winding of a cylindrical energy storage cell according to embodiments.

FIG. 6 shows an electrode winding of a cylindrical energy storage cell according to embodiments.

The electrode winding 20, 20', 20" comprises a first end side 21, 21', 21", a second end side 22, 22', 22' and a circumferential outer side 23, 23', 23", wherein, in the finished state of the cylindrical energy storage cell 100, 100', 100', the first end side 21, 21', 21" faces the cover 11 of the housing 10 and the second end side 22, 22', 22' faces the base 12 of the housing 10.

FIG. 7 shows a cylindrical energy storage cell according to one embodiment.

The cylindrical energy storage cell 100 comprises the housing with the cover 11, the base 12 and the circumferential shell 13 lying therebetween, the positive pole of the energy storage cell 100, as illustrated by (+) in FIG. 7, lying or being arranged at the cover, and the negative pole of the energy storage cell 100, as illustrated by (−) in FIG. 7, lying or being arranged at the shell 13.

Arranged in the housing is an electrode winding 20 which has been wound using the cathode 30 illustrated in FIG. 4 and the anode 40' illustrated in FIG. 5.

Here, a portion 21-1 of the first end side 21 of the electrode winding 20, said first end side facing the cover 11, is formed by that portion 31-2 of the first current collector 31 which is shown in FIG. 4 and which is not coated with the first active material 32, this portion 21-1 being electrically conductively connected to the cover 11 by way of a connecting element 70. During the production of the cylindrical energy storage cell 100, the portion 31-2 which protrudes after the winding of the electrode winding 20 is deformed, for example is subjected to flat rolling, in order to form the portion 21-1 of the first end side 21 of the electrode winding 20.

Furthermore, a portion 22-1 of the second end side 22 of the electrode winding 20, said second end side facing the base 12, is formed by that portion 41'-2, in particular that portion 41'-5, of the second current collector 41' which is shown in FIG. 5 and which is not coated with the second active material 42. This portion 22-1 is electrically conductively connected to the base 12, for example by welding. During the production of the cylindrical energy storage cell 100, the portion 41'-5 which protrudes after the winding of the electrode winding 20 is deformed, for example is subjected to flat rolling, in order to form the portion 22-1 of the second end side 22 of the electrode winding 20.

In the finished cylindrical energy storage cell 100, as illustrated in FIG. 7, that portion 41'-4 of the second current collector 41' which is shown in FIG. 5 extends beyond the first end side 21 of the electrode winding 20 in the direction of the cover 11 and is electrically conductively connected to the shell 13. Here, the connection between the portion 41'-4 and the shell 13 may be effected for example by welding, as illustrated by the arrow with the reference designation S, such that a radial weld seam which extends in a circumferential direction of the shell 13 is formed.

In order to prevent an electrical short circuit, an (annular) first electrical insulation 72 is provided between the shell 13 and the cover 11, and an (annular) second electrical insulation 71 is provided between the shell 13 and the portion 21-1 of the first end side 21 of the electrode winding 20.

FIG. 8 shows a cylindrical energy storage cell according to a different embodiment.

The structure of the cylindrical energy storage cell 100' shown in FIG. 8 corresponds substantially to the structure of the cylindrical energy storage cell 100 shown in FIG. 7.

In contrast to the cylindrical energy storage cell 100 shown in FIG. 7, in the case of the cylindrical energy storage cell 100' shown in FIG. 8 that portion 41'-3 of the portion 41'-1 which is shown in FIG. 5 extends beyond the second end side 22' in the direction of the base 12 and is electrically conductively connected to the shell 13. Here, the connection between the portion 41'-3 and the shell 13 may be effected for example by welding, as illustrated by the arrow with the reference designation S, such that a radial weld seam which extends in the circumferential direction of the shell 13 is formed.

FIG. 9 shows a cylindrical energy storage cell according to a further, different embodiment.

The structure of the cylindrical energy storage cell 100" shown in FIG. 9 corresponds substantially to the structure of the cylindrical energy storage cell 100' shown in FIG. 8.

In contrast to the cylindrical energy storage cell 100' shown in FIG. 8, in the case of the cylindrical energy storage cell 100" shown in FIG. 9 that portion 41'-4 of the portion 41'-1 which is shown in FIGS. 5 and 8 is either not provided, as in FIG. 3, or is subjected to flat rolling, but is in any case not connected to the shell 13 by welding.

FIG. 10 shows an energy storage module according to one embodiment.

The energy storage module 200 comprises an energy storage module housing 201 in which a plurality of the cylindrical energy storage cells 100, 100', 100" are arranged.

In order to cool the cylindrical energy storage cells 100, 100', 100', a cooling device 202 is also provided in the energy storage module housing 201 and may for example comprise, as illustrated in FIG. 10, a cooling plate which is flowed through by a cooling fluid and on which the cylindrical energy storage cells 100, 100', 100" are arranged.

FIG. 11 shows a vehicle according to one embodiment.

The vehicle 300, in particular the hybrid or electric vehicle, comprises an energy storage module 200 and a drive motor 301 which can be driven using electrical energy supplied by the cylindrical energy storage cells 100, 100', 100' of the energy storage module 200.

The invention claimed is:

1. A cylindrical energy storage cell for use as supplier of energy for a drive of an electric or hybrid vehicle, the cylindrical energy storage cell comprising:
   a cylindrical housing with a cover, a base and a circumferential shell lying between the cover and the base; and
   an electrode winding comprising a strip-like cathode, a strip-like anode and a strip-like separator arranged between the cathode and the anode, wherein:
   the electrode winding is arranged in the housing,
   the cathode comprises a first current collector which is coated in first portions with a first active material,
   the anode comprises a second current collector which is coated in second portions with a second active material,
   at least one winding of a portion of the second current collector that is not coated with the second active material is arranged around the electrode winding and in electrically conductive contact with at least one of the base or the shell,
   the electrode winding comprises a first end side, a second end side and a circumferential outer side,
   the first end side faces the cover and the second end side faces the base, and
   at least one of:
      a first part of the at least one winding of the portion of the second current collector that is not coated with the second active material around the electrode winding extends beyond the first end side in a direction of the cover and is electrically conductively connected to the shell, or
      a second part of the at least one winding of the portion of the second current collector that is not coated with the second active material around the electrode winding extends beyond the second end side in a direction of the base and is electrically conductively connected to the shell.

2. The cylindrical energy storage cell according to claim 1, wherein at least one of:
   the first part of the at least one winding of the portion of the second current collector that is not coated with the second active material around the electrode winding extends beyond the first end side in the direction of the cover and is electrically conductively connected to the shell by a first welded connection, or
   the second part of the at least one winding of the portion of the second current collector that is not coated with the second active material around the electrode winding extends beyond the second end side in the direction of the base and is electrically conductively connected to the shell by a second welded connection.

3. The cylindrical energy storage cell according to claim 2, wherein the first welded connection is a radial weld seam.

4. The cylindrical energy storage cell according to claim 2, wherein the second welded connection is a radial weld seam.

5. The cylindrical energy storage cell according to claim 1, wherein:
   at least one portion of the second end side is formed by portions of the second current collector which are not coated with the second active material, and
   the at least one portion of the second end side is electrically conductively connected to the base of the housing.

6. The cylindrical energy storage cell according to claim 5, wherein the at least one portion of the second end side is formed by deformation of the portions of the second current collector which protrude after the winding of the electrode winding and which are not coated with the second active material.

7. The cylindrical energy storage cell according to claim 1, wherein:
   at least one portion of the first end side is formed by portions of the first current collector which are not coated with the first active material, and
   the at least one portion of the first end side is electrically conductively connected to the cover of the housing.

8. The cylindrical energy storage cell according to claim 7, wherein the at least one portion of the first end side is formed by deformation of the portions of the first current collector which protrude after the winding of the electrode winding and which are not coated with the first active material.

9. An energy storage module comprising:
   an energy storage module housing; and
   the cylindrical energy storage cell according to claim 1, wherein the cylindrical energy storage cell is arranged in the energy storage module housing.

10. The energy storage module according to claim 9, further comprising a cooling device comprising a cooling plate which is arranged in the energy storage module housing and on which the cylindrical energy storage cell is arranged.

11. A vehicle comprising:
   the energy storage module according to claim 9; and
   a drive motor which is drivable using electrical energy supplied by the cylindrical energy storage cell of the energy storage module.

\* \* \* \* \*